US012204274B2

(12) United States Patent
Fukaya et al.

(10) Patent No.: US 12,204,274 B2
(45) Date of Patent: Jan. 21, 2025

(54) DEVELOPING CARTRIDGE INCLUDING SUPPLY ROLLER, LAYER THICKNESS REGULATION BLADE, AND SUPPLY ELECTRODE ELECTRICALLY CONNECTED TO BOTH SUPPLY ROLLER AND LAYER THICKNESS REGULATION BLADE

(71) Applicant: BROTHER KOGYO KABUSHIKI KAISHA, Nagoya (JP)

(72) Inventors: Atsushi Fukaya, Toyohashi (JP); Tomoya Ichikawa, Nagoya (JP); Koji Abe, Okazaki (JP); Naoya Kamimura, Ichinomiya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/343,856

(22) Filed: Jun. 29, 2023

(65) Prior Publication Data

US 2023/0341810 A1 Oct. 26, 2023

Related U.S. Application Data

(63) Continuation of application No. 17/375,187, filed on Jul. 14, 2021, now Pat. No. 11,733,643, which is a (Continued)

(30) Foreign Application Priority Data

Jan. 31, 2017 (JP) ................................. 2017-015177

(51) Int. Cl.
*G03G 21/16* (2006.01)
*G03G 21/18* (2006.01)
(Continued)

(52) U.S. Cl.
CPC ..... *G03G 21/1652* (2013.01); *G03G 21/1867* (2013.01); *G03G 15/065* (2013.01); *G03G 15/0812* (2013.01)

(58) Field of Classification Search
None
See application file for complete search history.

(56) References Cited

U.S. PATENT DOCUMENTS 5,697,022 A 12/1997 Matsuda et al.
2003/0228171 A1 12/2003 Miyabe et al.
(Continued)

FOREIGN PATENT DOCUMENTS

CN 1497373 A 5/2004
CN 1503070 A 6/2004
(Continued)

OTHER PUBLICATIONS

International Search Report and Written Opinion issued in related International Patent Application No. PCT/JP2017/023027, mailed Aug. 29, 2017.

(Continued)

*Primary Examiner* — Erika J. Villaluna
(74) *Attorney, Agent, or Firm* — Merchant & Gould P.C.

(57) ABSTRACT

A developing cartridge includes: a casing configured to accommodate therein toner; a developing roller; a supply roller configured to supply the toner to the developing roller; a layer thickness regulation blade in contact with a circumferential surface of the developing roller; a developing electrode electrically connected to the developing roller; and a supply electrode electrically connected to the supply roller and the layer thickness regulation blade. The supply electrode includes: an electrode member electrically connected to a rotation shaft of the supply roller and movable in a direction perpendicular to the rotation shaft; and a connec-
(Continued)

tion member in contact with and electrically connecting the electrode member and the layer thickness regulation blade. The electrode member is movable relative to the connection member in the direction perpendicular to the rotation shaft in a state where the electrode member is in contact with the connection member.

24 Claims, 7 Drawing Sheets

Related U.S. Application Data continuation of application No. 16/843,926, filed on Apr. 9, 2020, now Pat. No. 11,073,785, which is a continuation of application No. 16/525,877, filed on Jul. 30, 2019, now Pat. No. 10,649,366, which is a continuation of application No. PCT/JP2017/023027, filed on Jun. 22, 2017.

(51) Int. Cl.
*G03G 15/06* (2006.01)
*G03G 15/08* (2006.01)

(56) References Cited

U.S. PATENT DOCUMENTS

| | | | |
|---|---|---|---|
| 2004/0114961 | A1 | 6/2004 | Yoshino et al. |
| 2005/0185980 | A1 | 8/2005 | Okamoto |
| 2007/0166070 | A1 | 7/2007 | Sato |
| 2014/0153959 | A1 | 6/2014 | Handa et al. |
| 2014/0363189 | A1 | 12/2014 | Hashimoto et al. |
| 2015/0125175 | A1 | 5/2015 | Fujii |
| 2015/0125176 | A1 | 5/2015 | Fujii et al. |
| 2015/0192892 | A1 | 7/2015 | Iriyama et al. |
| 2016/0077485 | A1 | 3/2016 | Sproul |
| 2016/0266520 | A1 | 9/2016 | Iketani |

FOREIGN PATENT DOCUMENTS

| | | | |
|---|---|---|---|
| CN | 101046658 | A | 10/2007 |
| CN | 101477324 | A | 7/2009 |
| CN | 201583792 | U | 9/2010 |
| CN | 203490467 | U | 3/2014 |
| CN | 203705825 | U | 7/2014 |
| CN | 104428720 | A | 3/2015 |
| EP | 2 871 531 | A1 | 5/2015 |
| JP | 8-188297 | A | 7/1996 |
| JP | 2000-75660 | A | 3/2000 |
| JP | 2000-132062 | A | 5/2000 |
| JP | 2004-191526 | A | 7/2004 |
| JP | 2005-41610 | A | 2/2005 |
| JP | 2005-70393 | A | 3/2005 |
| JP | 2007-114653 | A | 5/2007 |
| JP | 2008-197588 | A | 8/2008 |
| JP | 2010-79212 | A | 4/2010 |
| JP | 2011-39564 | A | 2/2011 |
| JP | 2015-129808 | A | 7/2015 |
| JP | 2015-129814 | A | 7/2015 |
| JP | 2016-122127 | A | 7/2016 |
| JP | 2016-166988 | A | 9/2016 |

OTHER PUBLICATIONS

International Preliminary Report on Patentability issued in related International Patent Application No. PCT/JP2017/023027, mailed Aug. 15, 2019.
Extended European Search Report issued in corresponding European Patent Application No. 17894728.9, Oct. 1, 2020.
Office Action issued in corresponding Chinese Patent Application 201780085204.1, Apr. 22, 2021.
Office Action issued in corresponding Japanese Patent Application 2020-118206, Jun. 1, 2021.
Nishimura, JP 2008-197588 A, Aug. 2008, JPO Computer Translation (Year: 2008).

DEVELOPING CARTRIDGE INCLUDING SUPPLY ROLLER, LAYER THICKNESS REGULATION BLADE, AND SUPPLY ELECTRODE ELECTRICALLY CONNECTED TO BOTH SUPPLY ROLLER AND LAYER THICKNESS REGULATION BLADE

CROSS REFERENCE TO RELATED APPLICATION

This application is a continuation of U.S. patent application Ser. No. 17/375,187, filed Jul. 14, 2021, now U.S. Pat. No. 11,733,643, which is a continuation of U.S. application Ser. No. 16/843,926, filed Apr. 9, 2020, now U.S. Pat. No. 11,073,785, which is a continuation of U.S. application Ser. No. 16/525,877, filed Jul. 30, 2019, now U.S. Pat. No. 10,649,366, which is a continuation of International Application No. PCT/JP2017/023027 filed Jun. 22, 2017, which claims priority from Japanese Patent Application No. 2017-015177 filed Jan. 31, 2017. The entire contents of the applications noted above are incorporated herein by reference.

TECHNICAL FIELD

The present disclosure relates to a developing cartridge including a developing roller, a supply roller, and a layer thickness regulation blade.

BACKGROUND

Conventionally, there is known a developing cartridge including a developing roller, a supply roller configured to supply toner to the developing roller, a layer thickness regulation blade configured to regulate a thickness of a toner layer formed on the developing roller, and a supply electrode in contact with the supply roller. Specifically, in this technology, the supply electrode is movable in a direction perpendicular to a rotation shaft of the supply roller.

SUMMARY

In the conventional developing cartridge, it is desirable that voltage is applied to the layer thickness regulation blade.

Thus, an object of the present disclosure is to provide a developing cartridge in which electric power can be satisfactorily supplied to the layer thickness regulation blade.

In order to attain the above and other objects, according to one aspect, the disclosure provides a developing cartridge including a casing, a developing roller, a supply roller, a layer thickness regulation blade, a developing electrode, and a supply electrode. The casing is configured to accommodate therein toner. The supply roller is configured to supply the toner to the developing roller. The layer thickness regulation blade is in contact with a circumferential surface of the developing roller. The developing electrode is electrically connected to the developing roller. The supply electrode is electrically connected to the supply roller and the layer thickness regulation blade. The supply electrode includes an electrode member and a connection member. The electrode member is electrically connected to a rotation shaft of the supply roller and is movable in a direction perpendicular to the rotation shaft of the supply roller. The connection member electrically connects the electrode member and the layer thickness regulation blade. The connection member is in contact with the electrode member and the layer thickness regulation blade. The electrode member is movable relative to the connection member in the direction perpendicular to the rotation shaft of the supply roller in a state where the electrode member is in contact with the connection member.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

An embodiment of the present disclosure will next be described in detail while referring to the accompanying drawings.

Figure 1:
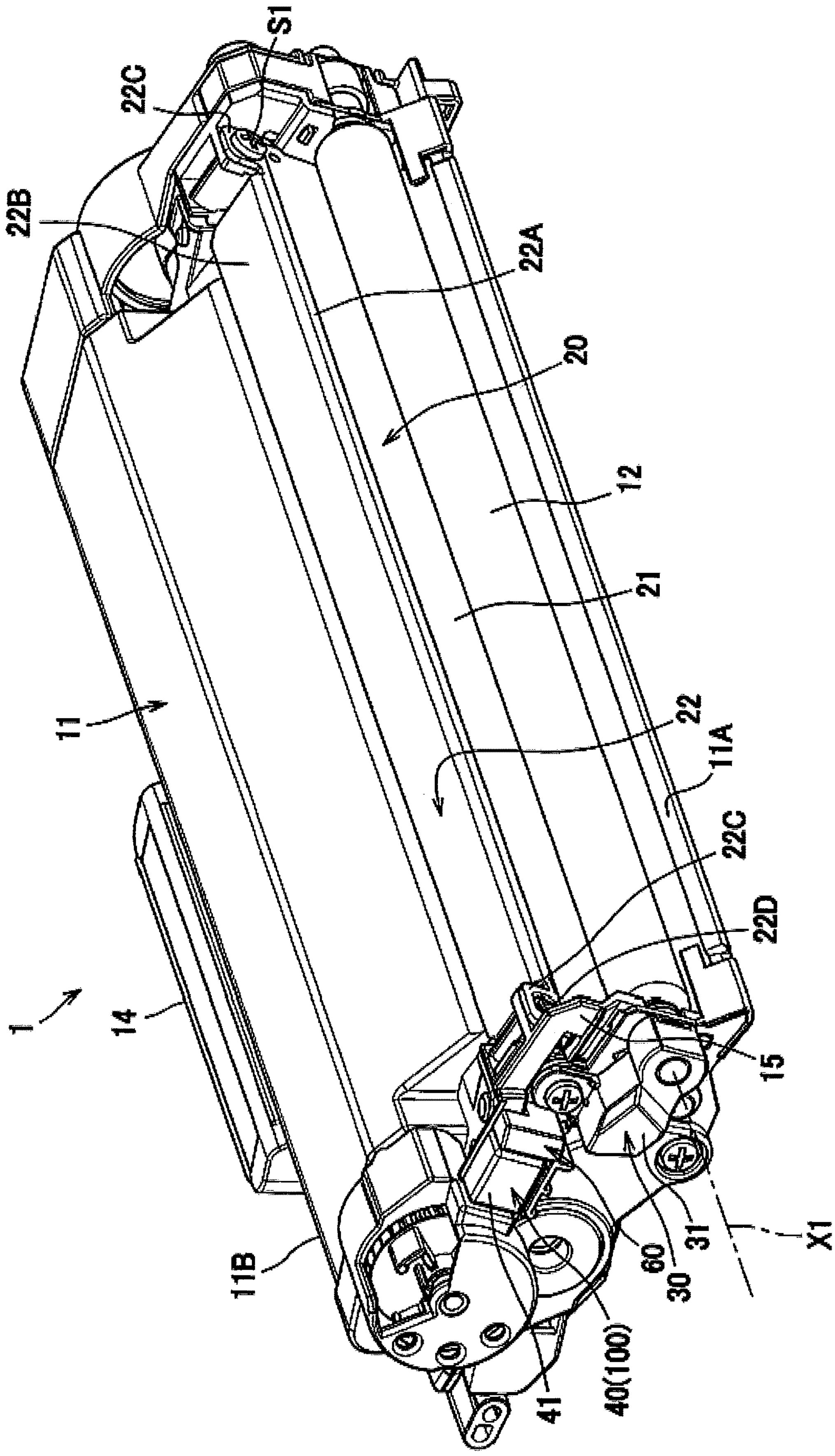
FIG. 1 is a perspective view of a developing cartridge according to one embodiment of the present disclosure.

As illustrated in FIG. 1, a developing cartridge 1 includes a casing 11, a developing roller 12, a supply roller 13 (see FIG. 2), a handgrip 14, a layer thickness regulation blade 20, a developing electrode 30, a supply electrode 100, and a bearing 60. The supply electrode 100 is a member electrically connected to the supply roller 13 and the layer thickness regulation blade 20. The supply electrode 100 includes an electrode member 40 and a spring 50.

The casing 11 accommodates therein toner. The casing 11 is made of non-conductive resin. The casing 11 includes a side wall 15. The side wall 15 is positioned at one end of the developing roller 12.

The developing roller 12 is a roller configured to supply toner to an electrostatic latent image formed on a photosensitive body (not illustrated). The developing roller 12 is rotatable about a first axis X1 extending in an axial direction. The developing roller 12 includes a shaft 12A (see FIG. 2) extending in the axial direction. The developing roller 12 is positioned at one end 11A of the casing 11.

Figure 2:
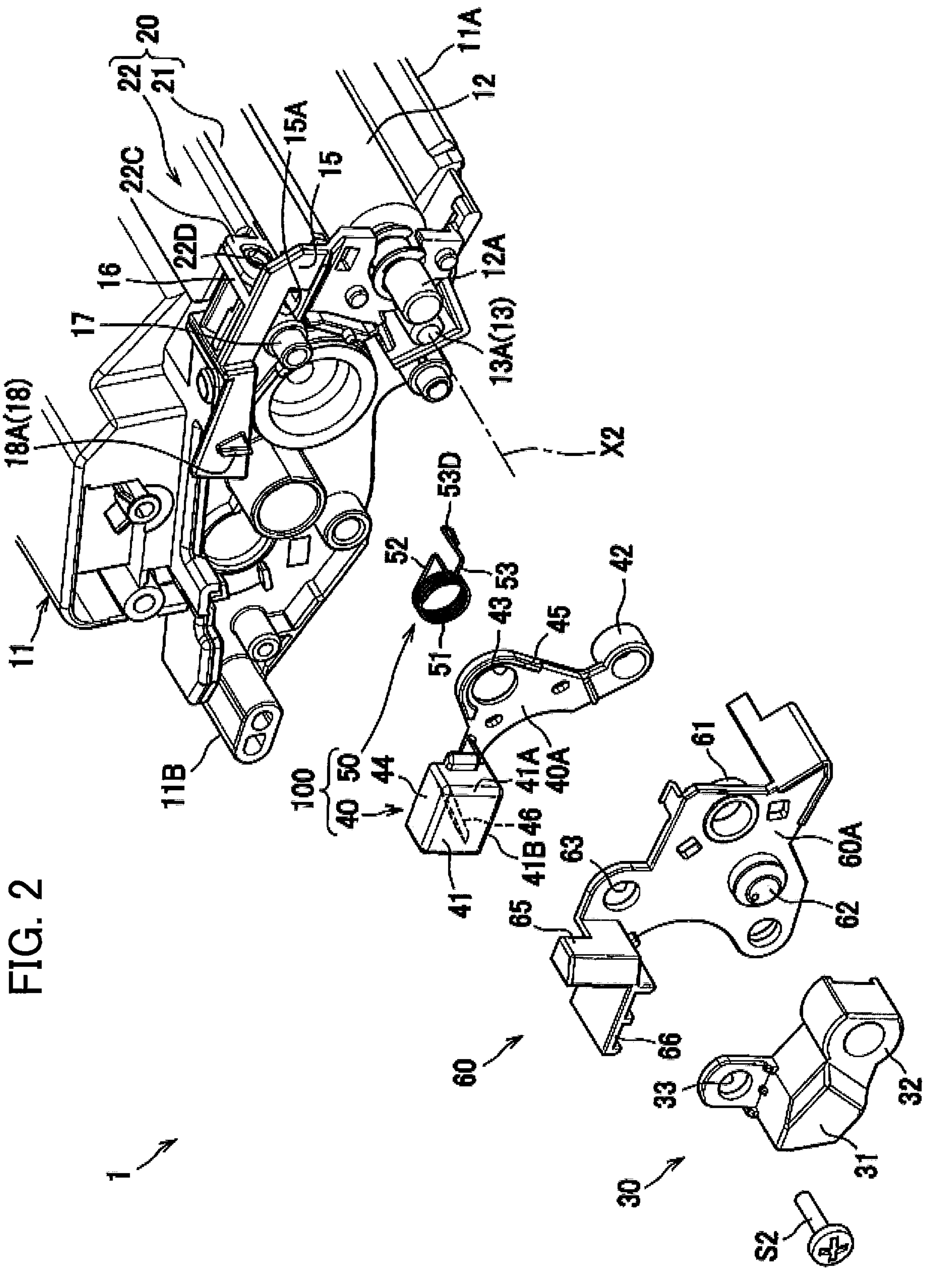
FIG. 2 is an exploded perspective view illustrating a developing electrode, a supply electrode, and other components.

As illustrated in FIG. 2, the supply roller 13 is a roller configured to supply toner to the developing roller 12. The supply roller 13 is rotatable about a second axis X2 extending in the axial direction. The supply roller 13 includes a shaft 13A extending in the axial direction. The supply roller 13 is in contact with the developing roller 12.

Turning back to FIG. 1, the handgrip 14 is a portion configured to be gripped by a user. The handgrip 14 is positioned at the other end 11B of the casing 11.

The layer thickness regulation blade 20 is a member configured to regulate a thickness of a toner layer formed on the developing roller 12. The layer thickness regulation blade 20 includes a blade 21 and a support member 22 supporting the blade 21.

The blade 21 is a rectangular metal plate extending in the axial direction. The blade 21 is made of metal such as stainless steel. The blade 21 has a thickness smaller than that of the support member. One end of the blade 21 in the short direction thereof is fixed to the support member 22 by welding, etc. The other end of the blade 21 in the short direction thereof is in contact with a circumferential surface of the developing roller 12.

Incidentally, a rubber member may be provided at the other end in the short direction of the blade 21. In this case, the rubber member of the blade 21 may be in contact with the developing roller 12.

The support member 22 is made of metal such as an electrogalvanized steel plate. The support member 22 includes a first wall 22A and a second wall 22B. The first wall 22A supports a surface of the blade 21 which is opposite to a surface of the blade 21 facing the developing roller 12. The second wall 22B is positioned at one end portion of the first wall 22A which is farther from the developing roller 12 than the other end portion of the first wall 22A is from the developing roller 12. The second wall 22B extends from the first wall 22A in a direction away from the blade 21.

The first wall 22A includes two protruding portions 22C. Each protruding portion 22C protrudes further in a direction away from the developing roller 12 than the second wall 22B. The second wall 22B is positioned between the two protruding portions 22C in the axial direction. Each protruding portion 22C has a through-hole 22D through which a first screw S1 (only one screw is depicted) is inserted. Each protruding portion 22C is fastened to the casing 11 by the corresponding first screw S1.

As illustrated in FIG. 2, the casing 11 includes a fixing wall 16 to which the protruding portion 22C is fixed. The side wall 15 has an opening 15A extending therethrough in the leftward/rightward direction. The opening 15A is overlapped with the fixing wall 16 and the protruding portion 22C as viewed in the axial direction. A part of the opening 15A is positioned closer to the one end 11A of the casing 11 than the protruding portion 22C is to the one end 11A. With this configuration, by inserting a contact portion 53D (described later) of the spring 50 through the opening 15A, the contact portion 53D can be inserted toward the blade 21 further than the side wall 15.

The casing 11 has a boss 17. The boss 17 has a tip end to which a second screw S2 is fixed for co-fastening the electrode member 40, the bearing 60, and the developing electrode 30. The casing 11 includes a protruding portion 18 protruding from the side wall 15 toward the electrode member 40. The protruding portion 18 has a cam surface 18A. The cam surface 18A is a surface for moving the electrode member 40 in a direction perpendicular to the second axis X2. The cam surface 18A is inclined so as to approach the side wall 15 with increasing distance from the second axis X2.

The developing electrode 30 is a member electrically connected to the shaft 12A of the developing roller 12. The developing electrode 30 is made of electrically conductive resin. The developing electrode 30 includes a first contact portion 31 and a cover portion 32, and has an attachment hole 33.

The first contact portion 31 is a surface configured to contact with a first main body side electrode in the axial direction in a state where the developing cartridge 1 is attached to a main body casing of an image forming apparatus (not illustrated). The first main body side electrode is provided at the main body casing. The first contact portion 31 is perpendicular to the axial direction. The first contact portion 31 is positioned at a position different from the position of the shaft 12A of the developing roller 12.

The cover portion 32 is formed in a generally hollow cylindrical shape so as to cover a circumferential surface of the shaft 12A of the developing roller 12. The inner circumferential surface of the cover portion 32 is in contact with the shaft 12A of the developing roller 12.

The attachment hole 33 is a hole through which the second screw S2 is inserted. The attachment hole 33 faces the boss 17 of the casing 11 in the axial direction. The developing electrode 30 is fixed to the boss 17 by the second screw S2.

The bearing 60 is made of non-conductive resin. The bearing 60 includes a base portion 60A, a first support portion 61, a second support portion 62, a first protruding portion 65, and a second protruding portion 66, and has a through-hole 63. The base portion 60A is formed in a flat plate shape perpendicular to the axial direction. The bearing 60 is positioned between the developing electrode 30 and the electrode member 40 in the axial direction.

The first support portion 61 is formed in a hollow cylindrical shape protruding from the base portion 60A toward the casing 11. The inner circumferential surface of the first support portion 61 supports the shaft 12A of the developing roller 12.

The second support portion 62 includes: a hollow cylindrical portion protruding from the base portion 60A in a direction away from the casing 11; and a bottom portion closing the opening of the tip end of the hollow cylindrical portion. The inner circumferential surface of the second support portion 62 supports the shaft 13A of the supply roller 13.

The through-hole 63 is a circular through-hole through which the boss 17 of the casing 11 is inserted. The through-hole 63 is positioned at a position facing the boss 17 in the axial direction.

The first protruding portion 65 and the second protruding portion 66 protrude from the base portion 60A in a direction away from the casing 11. The first protruding portion 65 is positioned adjacent to a first side 41A of a second contact portion 41 (described later) of the electrode member 40. The second protruding portion 66 is positioned adjacent to a second side 41B of the second contact portion 41, the second side 41B being perpendicular to the first side 41A.

The electrode member 40 is a member electrically connected to the shaft 13A that is a rotation shaft of the supply roller 13. The electrode member 40 is made of electrically conductive resin. The electrode member 40 includes a base 40A, a first portion 42, and a second portion 44. The electrode member 40 is movable in a direction perpendicular to the shaft 13A of the supply roller 13.

The base 40A is formed in a flat plate shape perpendicular to the axial direction. The base 40A has a hole 43. The base 40A connects the first portion 42 and the second portion 44. The base 40A is positioned between the bearing 60 and the casing 11 in the axial direction.

The hole 43 is a hole for fixing the electrode member 40 to the casing 11. The boss 17 of the casing 11 is inserted through the hole 43. The diameter of the hole 43 is greater than the outer diameter of the boss 17. A rib 45 protruding from the base 40A in a direction away from the casing 11 is formed at the periphery of the hole 43. The rib 45 is formed in a generally arcuate shape as viewed in the axial direction.

The first portion 42 is formed in a hollow cylindrical shape protruding from the base 40A toward the casing 11. The inner circumferential surface of the first portion 42 is in contact with the shaft 13A of the supply roller 13.

The second portion 44 is positioned at a position different from the position of the first portion 42. The second portion 44 protrudes from the base 40A in a direction away from the casing 11. The end surface of the second portion 44 serves as the second contact portion 41. The second contact portion 41 is a surface configured to contact with a second main body side electrode in the axial direction in a state where the developing cartridge 1 is attached to the main body casing of the image forming apparatus (not illustrated). The second main body side electrode is provided at the main body casing. That is, the second portion 44 is in contact with the second main body side electrode that is an external electrode.

The second contact portion 41 has a rectangular shape as viewed in the axial direction. The second contact portion 41 is perpendicular to the axial direction. The second contact portion 41 is positioned at a position different from the position of the shaft 13A of the supply roller 13. Specifically, the second contact portion 41 is positioned at a position opposite to the first portion 42 with respect to the hole 43.

The electrode member 40 is connected to the blade 21 through the spring 50. That is, the electrode member 40 is electrically connected to the blade 21 through a member other than the support member 22. The electrode member 40 is movable relative to the spring 50 in a direction perpendicular to the shaft 13A of the supply roller 13 in a state where the electrode member 40 is in contact with the spring 50.

Figure 3:
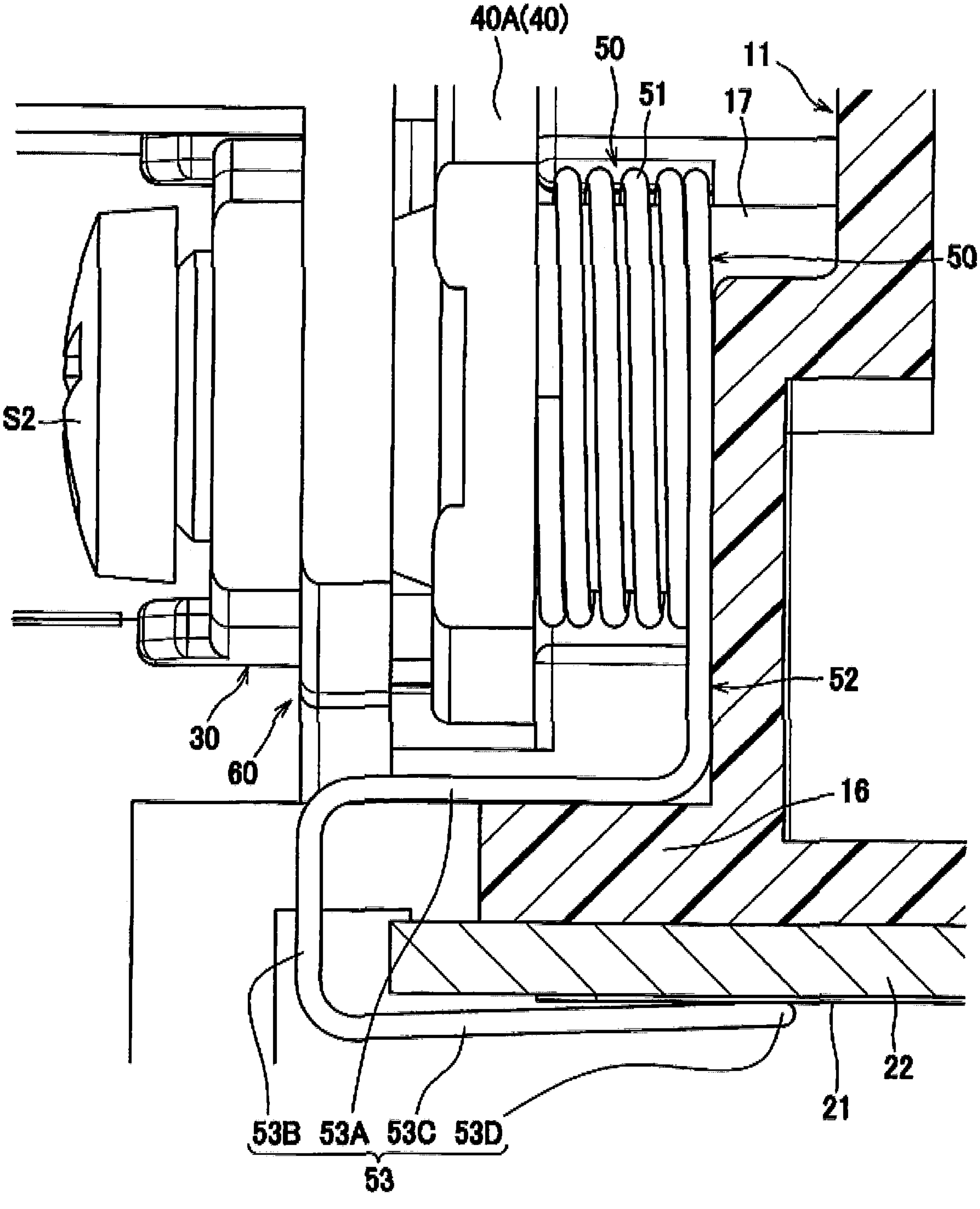
FIG. 3 is a cross-sectional view illustrating a spring, a casing, a support member, and a blade.

The spring 50 is a member for electrically connecting the base 40A of the electrode member 40 and the blade 21. The spring 50 is made of metal. The spring 50 includes a coil portion 51, an arm portion 52 and a nipping portion 53. As illustrated in FIG. 3, the coil portion 51 extends in the axial direction of the supply roller 13. The coil portion 51 is positioned between the base 40A and the casing 11. That is, the spring 50 is positioned between the base 40A and the casing 11. The coil portion 51 is in contact with the base 40A and the casing 11. The coil portion 51 is compressed from its natural length in a state where the electrode member 40 is assembled to the casing 11.

In the state where the electrode member 40 is assembled to the casing 11, the boss 17 is inserted in the coil portion 51. Hence, the coil portion 51 is supported by the outer circumferential surface of the boss 17.

Turning back to FIG. 2, the arm portion 52 is formed in a line shape. The arm portion 52 extends toward the blade 21 from one end portion of the coil portion 51 which is closer to the casing 11 than the other end portion of the coil portion 51 is to the casing 11. Specifically, the arm portion 52 extends outward in the radial direction of the coil portion 51 from the one end portion of the coil portion 51. More specifically, the arm portion 52 extends from the coil portion 51 toward the one end 11A of the casing 11. The arm portion 52 includes the nipping portion 53. The nipping portion 53 nips and supports the blade 21 and the fixing wall 16 which is a part of the casing 11. The nipping portion 53 is provided at a distal end of the arm portion 52.

As illustrated in FIG. 3, the nipping portion 53 nips the fixing wall 16, the support member 22, and the blade 21 together to support them. The nipping portion 53 has a U-shape as viewed in a direction which is perpendicular to both the axial direction and a direction perpendicular to a surface of the blade 21. Here, this surface of the blade 21 is the opposite surface to the surface of the blade 21 facing the support member 22.

The nipping portion 53 mainly includes a first part 53A, a second part 53B, a third part 53C, and the contact portion 53D. The first part 53A extends in the axial direction. The first part 53A is in contact with the fixing wall 16.

The second part 53B extend toward the one end 11A (see FIG. 2) of the casing 11 from one end portion of the first part 53A which is farther from the casing 11 than the other end portion of the first part 53A is from the casing 11. The second part 53B is positioned spaced away from the fixing wall 16, the support member 22 and the blade 21 in the axial direction.

The third part 53C extends toward the blade 21 from one end portion of the second part 53B which is farther from the first part 53A than the other end portion of the second part 53B is from the first part 53A. The third part 53C is inclined with respect to the surface of the blade 21. Specifically, the third part 53C is inclined so as to approach the first part 53A with decreasing distance in the axial direction between the third part 53C and the blade 21.

The contact portion 53D is a portion which is in contact with the surface of the blade 21. The contact portion 53D is provided at one end portion of the third part 53C which is closer to the blade 21 than the other end portion of the third part 53C is to the blade 21.

Figure 4:
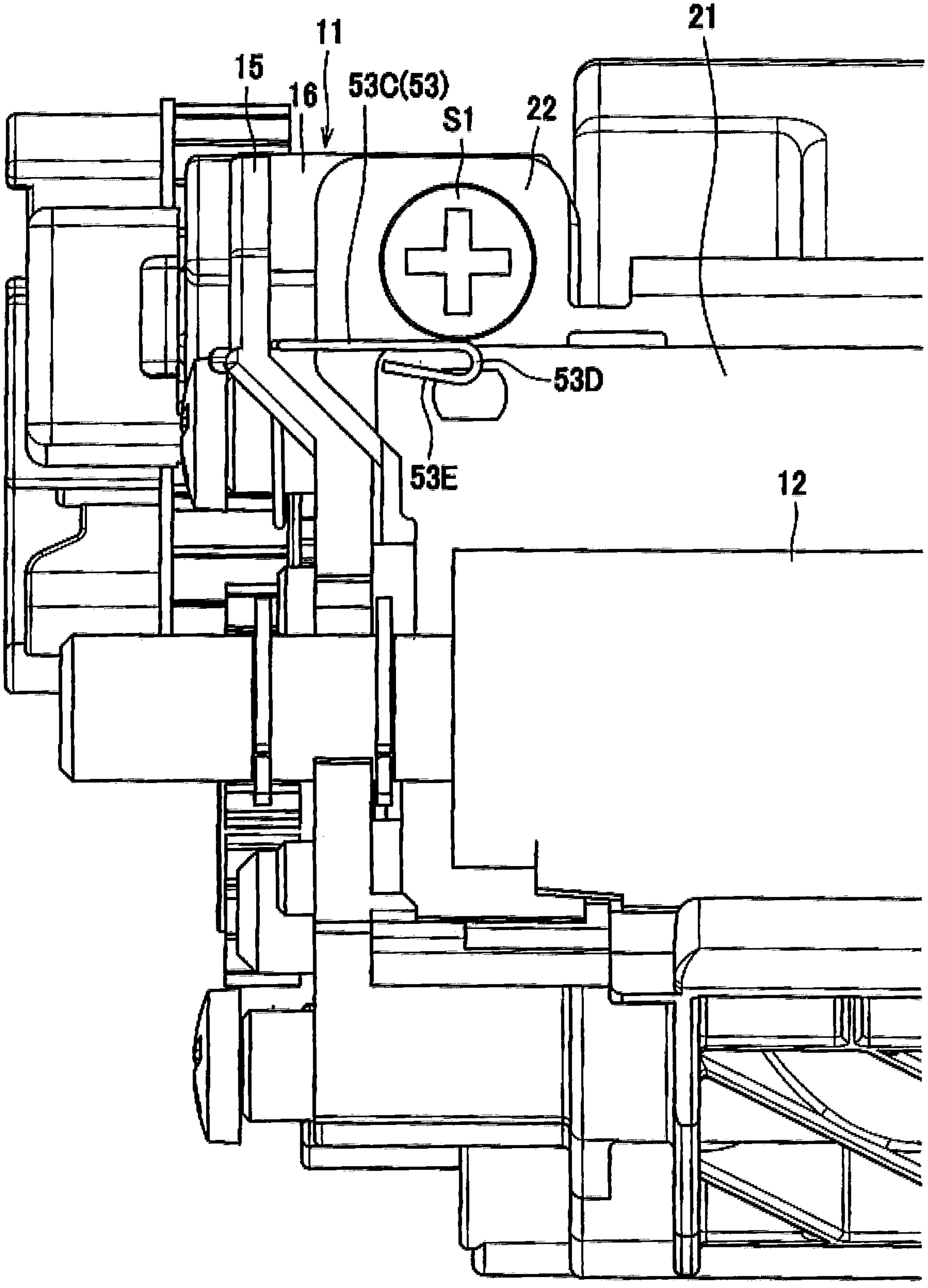
FIG. 4 is a view illustrating a relationship between a contact portion of the spring and the blade.

As illustrated in FIG. 4, the contact portion 53D is formed in a U-shape as viewed in a direction perpendicular to the surface of the blade 21. Specifically, the contact portion 53D has a U-shape which opens toward the side wall 15 of the casing 11. The contact portion 53D extends toward the developing roller 12 from the third part 53C as viewed in a direction perpendicular to the surface of the blade 21.

A fourth part 54E is provided at one end portion of the contact portion 53D which is farther from the third part 53C than the other end portion of the contact portion 53D is from the third part 53C. The fourth part 53E is inclined so as to approach the third part 53C as the fourth part 53E advances toward the side wall 15 from the contact portion 53D.

Figure 5A:
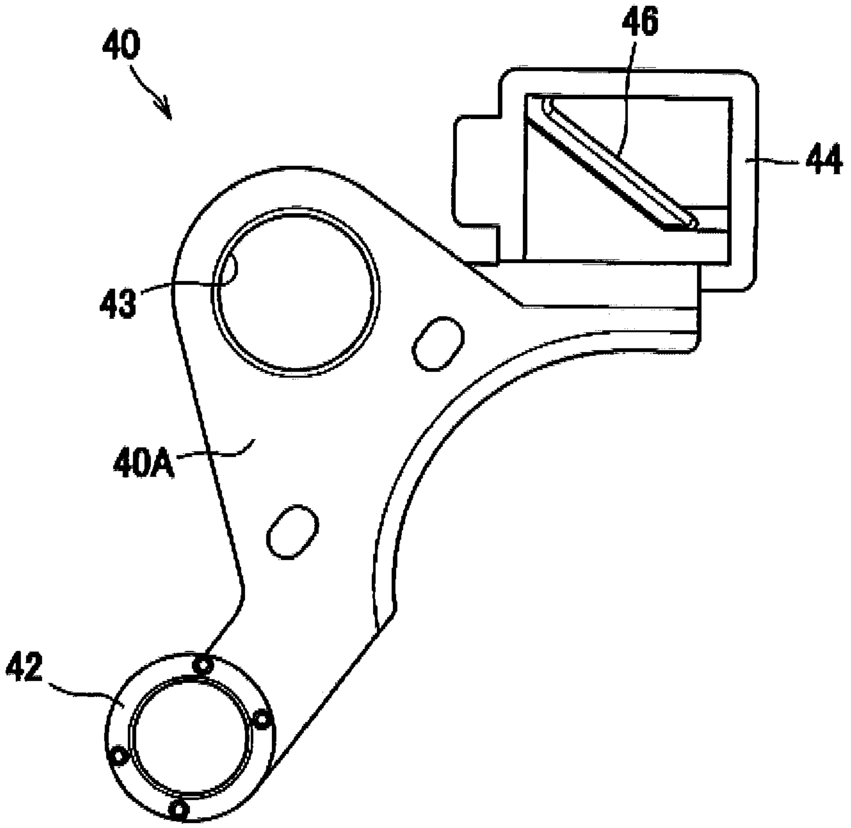
FIG. 5A is a view illustrating an electrode member as viewed from the casing.
Figure 5B:
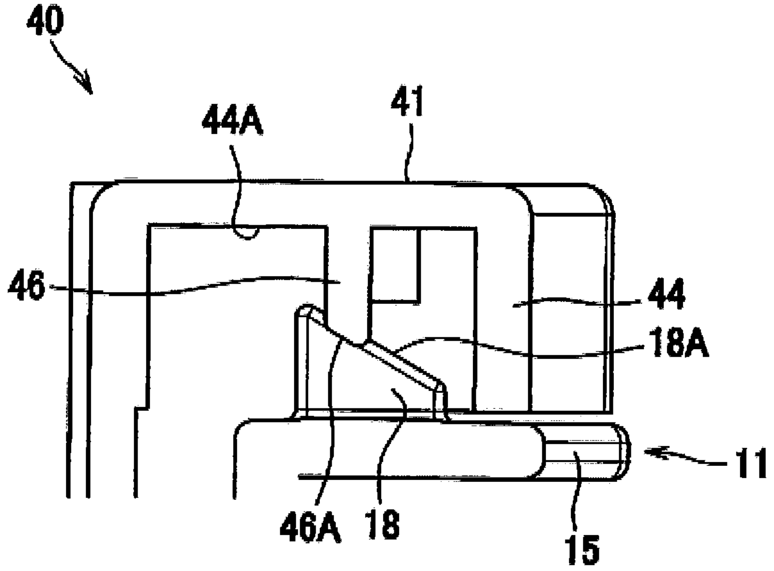
FIG. 5B is a view illustrating a relationship between a cam surface of the casing and a cam surface of the electrode member.

As illustrated in FIGS. 5A and 5B, the second portion 44 is formed in a box shape which opens toward the casing 11. The second portion 44 has a bottom surface 44A. The second portion 44 includes a rib 46 protruding toward the casing 11 from the bottom surface 44A.

The rib 46 extends along a diagonal line of the rectangular second contact portion 41. The rib 46 intersects the protruding portion 18 (see FIG. 2) of the casing 11 as viewed in the axial direction. The rib 46 has an end surface functioning as a cam surface 46A in conformance with the cam surface 18A of the protruding portion 18 of the casing 11. That is, the cam surface 46A is inclined so as to approach the casing 11 with increasing distance from the second axis X2.

Incidentally, the electrode member 40 is urged toward the bearing 60 by the spring 50. Thus, the surface of the electrode member 40 which faces the casing 11 is spaced away from the side wall 15.

Next, functions and effects of each member in accordance with attachment of the developing cartridge 1 to the main body casing will be described.

As a result of attachment of the developing cartridge 1 illustrated in FIG. 1 to the main body casing, the first main body side electrode is brought into contact with the first contact portion 31 of the developing electrode 30 in the axial direction, and the second main body side electrode is brought into contact with the second contact portion 41 of the electrode member 40 in the axial direction. Here, each of the first main body side electrode and the second main body side electrode has a spring. Hence, the second main body side electrode urges the electrode member 40 toward the casing 11.

As a result of the electrode member 40 being urged toward the developing cartridge 1, the cam surface 46A of the rib 46 is pressed against the cam surface 18A of the casing 11 as illustrated in FIG. 5B. Hence, as illustrated in FIG. 3, the electrode member 40 is pressed in a direction away from the second axis X2 by the cam surface 18A of the casing 11. Thus, the first portion 42 of the electrode member 40 can be caused to satisfactorily contact with the shaft 13A of the supply roller 13.

When performing printing control, a control device provided in the main body casing supplies electric power to the developing roller 12, the supply roller 13, and the blade 21. Specifically, the control device supplies electric power to the shaft 12A of the developing roller 12 through the developing electrode 30. Moreover, the control device supplies electric power to the shaft 13A of the supply roller 13 through the electrode member 40. Furthermore, the control device supplies electric power to the blade 21 through both the electrode member 40 and the spring 50.

According to the present embodiment, the following effects can be obtained in addition to the above-described effects.

In the present embodiment as constructed above, electric power can be satisfactorily supplied to the layer thickness regulation blade 20.

In the present embodiment, since the supply electrode 100 is electrically connected to the blade 21 without intervention of the support member 22, electric power can be satisfactorily supplied to the blade 21 in comparison with a connection configuration with intervention of the support member 22 whose electrical conductivity has been lowered due to surface treatment.

In the present embodiment, since the spring 50 is interposed between the base 40A of the electrode member 40 and the casing 11, a good contact state between the spring 50 and the base 40A can be maintained.

In the present embodiment, the position of the spring 50 can be favorably fixed relative to the casing 11 since the coil portion 51 of the spring 50 is supported by the outer circumferential surface of the boss 17.

In the present embodiment, because the fixing wall 16 (a part of the casing 11) and the blade 21 (the layer thickness regulation blade 20) are nipped by the nipping portion 53 of the spring 50, a good contact state between the spring 50 and the blade 21 (the layer thickness regulation blade 20) can be maintained.

Further, in the present embodiment, voltage can be applied to the layer thickness regulation blade 20 through the electrode member 40 in spite of the fact that a structure in which the electrode member 40 is movable is employed for ensuring electrical connection between the supply roller 13 and the electrode member 40.

Moreover, in the present embodiment, the coil portion 51 can be caused to satisfactorily contact with the base 40A because the coil portion 51 is positioned between the base 40A and the casing 11.

While the description has been made in detail with reference to the specific embodiment, it would be apparent to those skilled in the art that many modifications and variations may be made thereto and various embodiments are conceivable. In the following description, like parts and components are designated by the same reference numerals as those shown in the above-described embodiment to avoid duplicating description.

Figure 6:
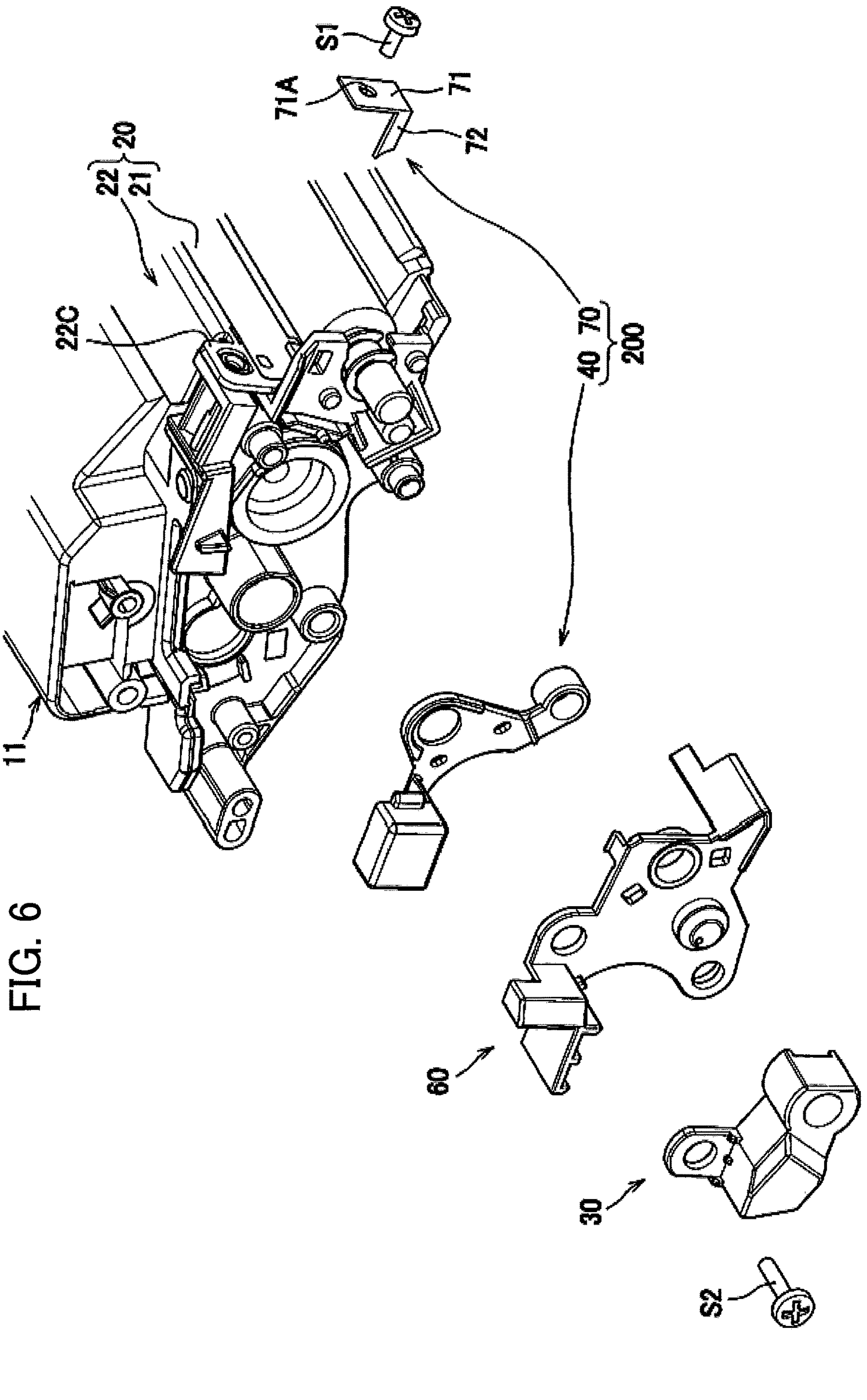
FIG. 6 is an exploded perspective view illustrating a supply electrode according to one modification.

In the above-described embodiment, the electrode member 40 is connected to the blade 21 through the spring 50. However, the electrical connection configuration between the electrode member 40 and the blade 21 is not limit to this structure. For example, as illustrated in FIG. 6, the electrode member 40 may be connected to the blade 21 through a connection member 70 made of electrically conductive resin or metal.

Figure 7:
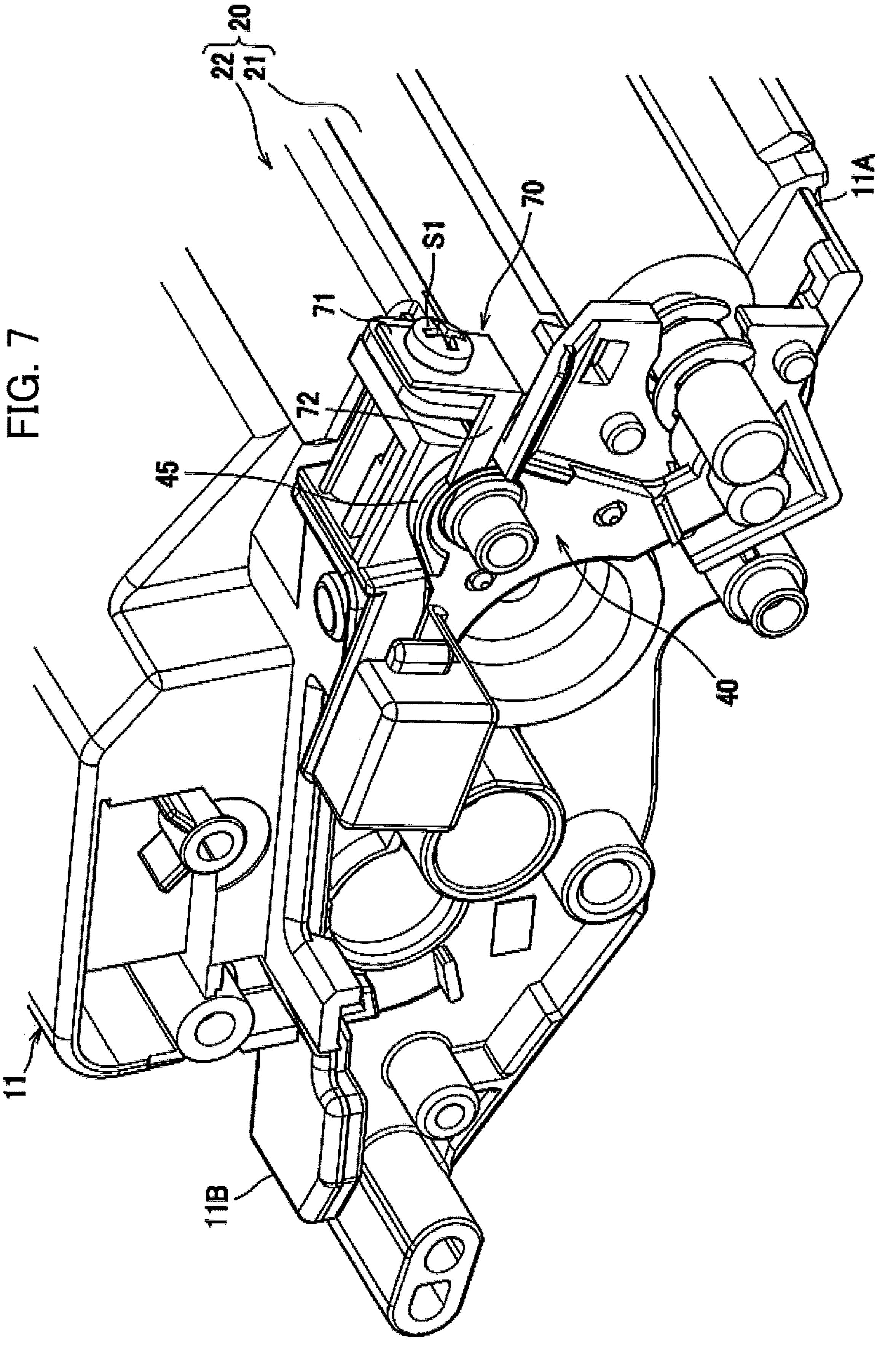
FIG. 7 is a perspective view illustrating a state where the supply electrode according to the modification is assembled to the casing.

Specifically, according to this embodiment, a supply electrode 200 includes the electrode member 40 of the above-described embodiment and the connection member 70. The connection member 70 includes a plate portion 71 and an extension portion 72. The plate portion 71 faces the protruding portion 22C of the support member 22 and the blade 21. The plate portion 71 has a hole 71A through which the first screw S1 is inserted. As illustrated in FIG. 7, the plate portion 71 is fixed to the casing 11 together with the protruding portion 22C of the support member 22 by the first screw S1. The plate portion 71 is in contact with the blade 21.

The extension portion 72 extends from the plate portion 71 toward the rib 45 of the electrode member 40. Specifically, the extension portion 72 extends in a direction perpendicular to the plate portion 71. The tip end portion of the extension portion 72 is in contact with the rib 45. Also in this embodiment, since the supply electrode 200 is connected to the blade 21 without intervention of the support member 22, electric power can be satisfactorily supplied to the blade 21 in comparison with a connection configuration with intervention of the support member 22 whose electrical conductivity has been lowered due to surface treatment. Furthermore, in this embodiment, since the connection member 70 and the support member 22 are co-fastened to the casing 11, the connection member 70 can be caused to satisfactorily contact with the blade 21 (the layer thickness regulation blade 20) by the fastening force of the co-fastening.

In the above-described embodiments, the connection member (50 or 70) is formed separately from the electrode member 40. However, the connection member need not necessarily be formed separately from the electrode member 40 and the connection member may be formed integrally with the electrode member. For example, the connection member 70 illustrated in FIG. 7 may be formed integrally with the electrode member 40.

Incidentally, the materials of the developing electrode 30, electrode member 40 and the spring 50 can be changed as appropriate. For example, the developing electrode 30 and the electrode member 40 may be made of any other electrically conductive material such as metal. Moreover, the spring 50 may be made of any other electrically conductive material such as electrically conductive resin.

In the above-described embodiment, the spring 50 including the coil portion 51 has been described as an example of the spring. However, the spring is not limited to this structure. For example, a leaf spring may be used as the spring.

Further, implementation can be performed with any combination of the components employed in the above-described embodiments and modifications.

What is claimed is:

1. A cartridge comprising:

a developing roller rotatable about a first axis extending in a first direction;

a casing configured to accommodate toner therein, the casing including a first outer surface and a second outer surface spaced apart from the first outer surface in the first direction;

a layer thickness regulation blade extending in the first direction, the layer thickness regulation blade including one end portion and another end portion spaced apart from the one end portion in the first direction, the one end portion of the layer thickness regulation blade being closer to the first outer surface in the first direction than the another end portion of the layer thickness regulation blade is to the first outer surface in the first direction;

an electrode electrically connected to the layer thickness regulation blade, the electrode being positioned at the first outer surface, the electrode including:

an electrical contact surface, the electrical contact surface being farther from the another end portion of the layer thickness regulation blade than the one end portion of the layer thickness regulation blade is from the another end portion of the layer thickness regulation blade in the first direction; and a plate extending in the first direction; and a screw fixing the plate and the one end portion of the layer thickness regulation blade to the casing.

2. The cartridge according to claim 1, wherein the layer thickness regulation blade further includes:

a blade in contact with a circumferential surface of the developing roller; and a support member made of metal, the support member supporting the blade, the support member including the one end portion and the another end portion, and wherein the support member of the layer thickness regulation blade and the plate are fixed to the casing by the screw.

3. The cartridge according to claim 2, wherein the support member has a first hole, and wherein the screw is inserted through the first hole.

4. The cartridge according to claim 2, wherein in a state where the support member and the plate are fixed to the casing by the screw, the support member is positioned between the plate and the casing.

5. The cartridge according to claim 3, wherein the plate has a second hole, and wherein the screw is inserted through the second hole.

6. The cartridge according to claim 2, wherein the support member includes:

a first wall supporting the blade; and a second wall extending from the first wall in a direction away from the blade.

7. The cartridge according to claim 6, wherein the blade is fixed to the first wall by welding.

8. The cartridge according to claim 2, wherein the support member is made of an electrogalvanized steel.

9. The cartridge according to claim 1, wherein the electrode further includes an extension portion extending in a second direction crossing the first direction, the extension portion being positioned between the plate and the electrical contact surface.

10. The cartridge according to claim 1, further comprising:

a bearing supporting one end of the developing roller, wherein the bearing is made of non-conductive resin.

11. The cartridge according to claim 10, further comprising:

the bearing having a first hollow, wherein the developing roller includes a developing roller shaft, the developing roller shaft being inserted in the first hollow.

12. The cartridge according to claim 10, further comprising:

a supply roller rotatable about a second axis extending in the first direction, the supply roller including a supply roller shaft, wherein the bearing further has a second hollow, and wherein the supply roller shaft is inserted in the second hollow.

13. The cartridge according to claim 1, further comprising:

a supply roller rotatable about a second axis extending in the first direction, the supply roller including a supply roller shaft, wherein the electrode is electrically connected to the supply roller shaft.

14. The cartridge according to claim 2, wherein the plate is in contact with the blade.

15. The cartridge according to claim 1, further comprising:

a developing electrode electrically connected to the developing roller.

16. The cartridge according to claim 1, wherein the plate is formed separately from the electrical contact surface.

17. The cartridge according to claim 1, wherein the plate is made of metal.

18. A cartridge comprising:

a developing roller rotatable about a first axis extending in a first direction;

a casing configured to accommodate toner therein, the casing having a first outer surface and a second outer surface spaced apart from the first outer surface in the first direction;

a blade extending in the first direction, the blade having one end portion and another end portion in the first direction, the one end portion of the blade being closer to the first outer surface in the first direction than the another end portion of the blade is to the first outer surface in the first direction;

a support member supporting the blade, the support member being made of metal;

an electrode electrically connected to the blade, the electrode being positioned at the first outer surface, the electrode including:

an electrical contact surface positioned on an opposite side of the one end portion of the blade from the another end portion of the blade in the first direction; and a plate facing the support member; and a screw fixing the plate and the support member to the casing.

19. A cartridge comprising:

a developing roller rotatable about a first axis extending in a first direction;

a casing configured to accommodate toner therein, the casing having a first outer surface and a second outer surface spaced apart from the first outer surface in the first direction, the first outer surface having an opening extending through the first outer surface in the first direction;

a blade extending in the first direction, the blade having one end portion and another end portion in the first direction, the one end portion of the blade being closer to the first outer surface in the first direction than the another end portion of the blade is to the first outer surface in the first direction; and an electrode electrically connected to the blade, the electrode being positioned at the first outer surface, the electrode including:

an electrical contact surface, the electrical contact surface being farther from the another end portion of the blade than the one end portion of the blade is from the another end portion of the blade in the first direction, a plate extending in the first direction; and a screw fixing the plate and the one end portion of the blade to the casing;

wherein a portion of the electrode is inserted through the opening.

20. The cartridge according to claim 19, wherein the portion of the electrode is in contact with the blade.

21. The cartridge according to claim 19, wherein the portion of the electrode includes a spring.

22. The cartridge according to claim 21, wherein the spring is a coil spring.

23. The cartridge according to claim 19, wherein the electrical contact surface is positioned on an opposite side of the first outer surface from the blade in the first direction.

24. The cartridge according to claim 19, wherein the portion of the electrode is between the electrical contact surface and the another end portion of the blade in the first direction.

* * * * *